(12) United States Patent
Tateishi et al.

(10) Patent No.: US 12,250,984 B2
(45) Date of Patent: *Mar. 18, 2025

(54) SHOE SOLE MEMBER AND SHOE (71) Applicant: ASICS CORPORATION, Kobe (JP)

(72) Inventors: Junichiro Tateishi, Kobe (JP); Takashi Yamade, Kobe (JP); Daisuke Sawada, Kobe (JP); Takashi Osaki, Kobe (JP); Kenichi Harano, Kobe (JP)

(73) Assignee: ASICS CORPORATION, Kobe (JP)

( * ) Notice: Subject to any disclaimer, the term of this patent is extended or adjusted under 35 U.S.C. 154(b) by 1158 days.

This patent is subject to a terminal disclaimer.

(21) Appl. No.: 16/966,515

(22) PCT Filed: Jan. 31, 2018

(86) PCT No.: PCT/JP2018/003229
§ 371 (c)(1),
(2) Date: Jul. 31, 2020

(87) PCT Pub. No.: WO2019/150491
PCT Pub. Date: Aug. 8, 2019

(65) Prior Publication Data
US 2021/0045491 A1  Feb. 18, 2021

(51) Int. Cl.
A43B 13/02    (2022.01)
A43B 13/18    (2006.01)
C08L 23/02    (2006.01)
C08L 23/08    (2006.01)
C08L 23/0807  (2025.01)
C08L 53/02    (2006.01)
C08L 75/04    (2006.01)
C08L 77/00    (2006.01)

(52) U.S. Cl.
CPC .......... *A43B 13/026* (2013.01); *A43B 13/187* (2013.01); *C08L 23/02* (2013.01); *C08L 23/0815* (2013.01); *C08L 53/02* (2013.01); *C08L 75/04* (2013.01); *C08L 77/00* (2013.01); *C08L 2205/14* (2013.01); *C08L 2205/22* (2013.01)

(58) Field of Classification Search
CPC ..... A43B 13/026; A43B 13/187; A43B 13/04; C08L 23/02; C08L 23/0815; C08L 53/02; C08L 75/04; C08L 77/00; C08L 2205/14; C08L 2205/22
See application file for complete search history.

(56) References Cited

U.S. PATENT DOCUMENTS

| | | |
|---|---|---|
| 3,836,617 A | 9/1974 | Lankheet |
| 5,633,286 A | 5/1997 | Chen |
| 6,358,459 B1 | 3/2002 | Ziegler et al. |
| 2002/0058135 A1 | 5/2002 | Yates |
| 2005/0027025 A1* | 2/2005 | Erb .......... A43B 17/003 521/50 |
| 2007/0197949 A1 | 8/2007 | Chen |
| 2010/0047550 A1 | 2/2010 | Prissok et al. |
| 2011/0097585 A1 | 4/2011 | Miyazawa |
| 2014/0007456 A1 | 1/2014 | Tadin |
| 2014/0151918 A1 | 6/2014 | Hartmann |
| 2014/0223673 A1 | 8/2014 | Wardlaw et al. |
| 2014/0223776 A1 | 8/2014 | Wardlaw et al. |
| 2014/0259329 A1 | 9/2014 | Watkins et al. |
| 2014/0296762 A1 | 10/2014 | Hecker et al. |
| 2015/0252163 A1 | 9/2015 | Prissok et al. |
| 2016/0088901 A1 | 3/2016 | Mahoney |
| 2016/0227876 A1 | 8/2016 | Le et al. |
| 2017/0036377 A1 | 2/2017 | Baghdadi et al. |
| 2017/0072599 A1 | 3/2017 | Huang et al. |
| 2017/0095987 A1* | 4/2017 | Feng .......... B29D 35/12 |
| 2017/0318901 A1 | 11/2017 | Nishi |
| 2017/0341326 A1 | 11/2017 | Holmes et al. |
| 2019/0291371 A1 | 9/2019 | Wardlaw et al. |
| 2020/0032022 A1 | 1/2020 | Prissok et al. |
| 2020/0221820 A1 | 7/2020 | Le et al. |

FOREIGN PATENT DOCUMENTS

| | | |
|---|---|---|
| CN | 101583656 A | 11/2009 |
| CN | 105121528 A | 12/2015 |
| CN | 105856483 A | 8/2016 |
| CN | 106560303 A | 4/2017 |
| EP | 2 786 670 A1 | 10/2014 |
| GB | 1082277 A | 9/1967 |

(Continued)

OTHER PUBLICATIONS

Communication pursuant to Article 94(3) EPC issued by the European Patent Office on Feb. 14, 2023, which corresponds to European Patent Application No. 18903652.8-1014 and is related to U.S. Appl. No. 16/966,515.
An Office Action mailed by the United States Patent and Trademark Office on Nov. 25, 2022, which corresponds to U.S. Appl. No. 16/966,518 and is related to U.S. Appl. No. 16/966,515.
Notice of Allowance mailed by the United States Patent and Trademark Office on Apr. 20, 2023, which corresponds to U.S. Appl. No. 16/966,518 and is related to U.S. Appl. No. 16/966,515.
Notification of Transmittal of Translation of the International Preliminary Report on Patentability and English Translation of the International Preliminary report on patentability (chapter II), PCT/JP2018/003229, mailed on Aug. 6, 2020.
The extended European search report issued by the European Patent Office on Apr. 6, 2021, which corresponds to European Patent Application No. 18903652.8-1017 and is related to U.S. Appl. No. 16/966,515.

(Continued)

Primary Examiner — Jessica M Roswell
(74) Attorney, Agent, or Firm — Studebaker Brackett PLLC (57) ABSTRACT

Provided is a shoe sole member partially or entirely formed of a resin composite in which a plurality of resin foam particles are integrated with one or more non-foamed elastic bodies, wherein a resin composition constituting the one or more elastic bodies and a resin composition constituting the plurality of resin foam particles both include a polyolefin-based resin as a main component, or both include a polyurethane-based resin as a main component. Also provided is a shoe including the shoe sole member.

6 Claims, 1 Drawing Sheet

(56) References Cited

FOREIGN PATENT DOCUMENTS

| | | | |
|---|---|---|---|
| JP | S49-47401 Y1 | 12/1974 | |
| JP | H08-038211 A | 2/1996 | |
| JP | H08-238111 A | 9/1996 | |
| JP | H08-290432 A | 11/1996 | |
| JP | H9-272161 A | 10/1997 | |
| JP | H10-179364 A | 7/1998 | |
| JP | H11-10743 A | 1/1999 | |
| JP | 2000-135101 A | 5/2000 | |
| JP | 2000-246849 A | 9/2000 | |
| JP | 2006-137032 A | 6/2006 | |
| JP | 2013-220354 A | 10/2013 | |
| JP | 2014-151202 A | 8/2014 | |
| JP | 2014-151210 A | 8/2014 | |
| JP | 2014-521418 A | 8/2014 | |
| JP | 2014-158708 A | 9/2014 | |
| JP | 2015-51258 A | 3/2015 | |
| JP | 2015-513354 A | 5/2015 | |
| JP | 2016-141153 A | 8/2016 | |
| JP | 2017-61143 A | 3/2017 | |
| JP | 2018-12326 A | 1/2018 | |
| KR | 20-0342160 Y1 | 2/2004 | |
| WO | 2016/076432 A1 | 5/2016 | |

OTHER PUBLICATIONS

The extended European search report issued by the European Patent Office on Mar. 3, 2021, which corresponds to European Patent Application No. 18903513.2-1005 and is related to U.S. Appl. No. 16/966,515.
An Office Action mailed by China National Intellectual Property Administration on Sep. 30, 2021, which corresponds to Chinese Patent Application No. 201880088245.0 and is related to U.S. Appl. No. 16/966,515 with English language translation.
An Office Action mailed by China National Intellectual Property Administration on Jun. 2, 2021 which corresponds to Chinese Patent Application No. 201880088244.6 and is related to U.S. Appl. No. 16/966,515 with English language translation.
An Office Action mailed by China National Intellectual Property Administration on Feb. 23, 2022, which corresponds to Chinese Patent Application No. 201880088245.0 and is related to U.S. Appl. No. 16/966,515; with English language translation.
Communication pursuant to Article 94(3) EPC issued by the European Patent Office on Feb. 24, 2022, which corresponds to European Patent Application No. 18905652.8-1017 and is related to U.S. Appl. No. 16/966,515.
The extended European search report issued by the European Patent Office on Mar. 3, 2021, which corresponds to European Patent Application No. 18903771.6-1005 and is related to U.S. Appl. No. 16/966,515.
An Office Action mailed by China National Intellectual Property Administration on Apr. 14, 2021, which corresponds to Chinese Patent Application No. 201880088225.3 and is related to U.S. Appl. No. 16/966,515; with English language translation.
International Search Report issued in PCT/JP2018/003229; mailed Mar. 13, 2018.
International Search Report issued in PCT/JP2018/003230; mailed Mar. 6, 2018.
International Search Report issued in PCT/JP2018/003231; mailed May 1, 2018.
An Office Action mailed by the United States Patent and Trademark Office on Aug. 31, 2023, which corresponds to U.S. Appl. No. 16/966,516 and is related to U.S. Appl. No. 16/966,515.
Communication pursuant to Article 94(3) EPC issued by the European Patent Office on Feb. 13, 2024, which corresponds to European Patent Application No. 18903513.2.
An Office Action mailed by the United States Patent and Trademark Office on Mar. 7, 2024, which corresponds to U.S. Appl. No. 16/966,516 and is related to U.S. Appl. No. 16/966,515.

* cited by examiner

SHOE SOLE MEMBER AND SHOE

FIELD

The present invention relates to a shoe sole member and a shoe, and more specifically, to a shoe sole member that is partially or entirely formed of a resin composite including a plurality of resin foam particles, and a shoe including the shoe member.

BACKGROUND

Shoe sole members are required to have excellent cushioning performance. Generally, a foam product is used as a material for the shoe sole members that satisfy such requirements. For example, Patent Literatures 1 to 3 disclose shoe sole members composed of a foam product formed by welding a plurality of foam particles.

In the shoe sole member using such a foam product, the cushioning properties of the shoe sole member can be effectively enhanced by increasing the expansion ratio of the foam product. Further, due to the low initial stiffness of the foam product of high expansion ratio, shoes including such a foam product as the shoe sole member have soft and comfortable wearing feeling when the foot fits in the shoe.

However, when the shoe sole member for which such a conventional foam product is used is repeatedly and continuously subjected to high load by use, the shape restoring force of the foam product deformed due to the load is likely to decrease. This causes a problem that cushioning properties and durability of the shoe sole member are likely to decrease. Especially, in sports shoes such as basketball shoes and running shoes, of which the shoe soles are liable to be subjected to a high load, the load tends to concentrate in certain areas of the shoe sole member, in which the restoring force is likely to decrease.

In order to address such a problem, a shoe sole member in which a plurality of foam products respectively composed of different kinds of resin are combined together is known, as disclosed in Patent Literature 4. Combining together the plurality of foam products respectively composed of the different kinds of resin, as described above, enables the cushioning properties, shape restoring force, weight, or the like of the shoe sole member to be suitably adjusted.

However, such a shoe sole member is formed of different kinds of resin combined together, resulting in a relatively low adhesive strength at the interface between the different kinds of resin. Therefore, there is a problem that, when the shoe sole member is subjected to a high load, the different kinds of resin constituting the shoe sole member are liable to be separated from each other at their interface to thereby decrease the strength of the shoe sole member.

CITATION LIST

Patent Literature

Patent Literature 1: JP 2014-521418 T
Patent Literature 2: JP 2013-220354 A
Patent Literature 3: JP 2014-151210 A
Patent Literature 4: JP H8-238111 A

SUMMARY

Technical Problem

In view of the abovementioned problem, it is an object of the present invention to provide a shoe sole member having a high mechanical strength, and a shoe including the shoe sole member.

Solution to Problem

The present inventors have found that the above problem can be solved by using a resin composite in which a plurality of resin foam particles composed of a resin composition including an olefin-based or polyurethane-based resin are integrated with elastic bodies composed of a resin composition including a resin of the same base.

That is, a shoe sole member according to the present invention is partially or entirely formed of a resin composite in which a plurality of resin foam particles are integrated with one or more non-foamed elastic bodies, wherein a resin composition constituting the one or more elastic bodies and a resin composition constituting the plurality of resin foam particles both include a polyolefin-based resin as a main component, or both include a polyurethane-based resin as a main component.

In the shoe sole member according to the present invention, for example, the resin composition constituting the one or more elastic bodies and the resin composition constituting the plurality of resin foam particles both include the polyolefin-based resin as the main component.

In the shoe sole member according to the present invention, for example, the resin composition constituting the one or more elastic bodies and the resin composition constituting the plurality of resin foam particles both include the polyurethane-based resin as the main component.

In the shoe sole member according to the present invention, it is preferable that the one or more elastic bodies have an initial elastic modulus at 23° C. being larger than an initial elastic modulus at 23° C. of the plurality of resin foam particles.

A shoe according to the present invention includes the abovementioned resin composition.

DESCRIPTION OF EMBODIMENTS

Hereinafter, an embodiment of a shoe sole member and a shoe of the present invention will be described with reference to the drawings. The following embodiments are shown merely as examples. The present invention is not limited to the following embodiments at all.

Figure 1:
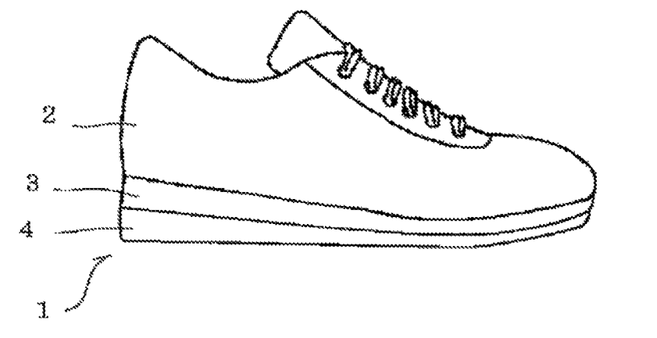
FIG. 1 is a schematic view showing a shoe in which a shoe sole member of one embodiment is used.

FIG. 1 shows a shoe 1 provided with a shoe sole member of this embodiment as a midsole. The shoe 1 includes an upper member 2 covering an upper side of a foot, and shoe sole members 3 and 4 disposed on a lower side of the upper member 2 to form a shoe sole. The shoe 1 includes, as the shoe sole members, an outer sole 4 disposed at a position to engage with the ground, and a midsole 3 disposed between the upper member 2 and the outer sole 4.

The shoe sole member of this embodiment is formed of a resin composite in which non-foamed elastic bodies are integrated with a plurality of resin foam particles. Specifically, the shoe sole member is partially or entirely formed of the resin composite that includes a foam product with the plurality of resin foam particles integrated together, and the non-foamed elastic bodies dispersed in the foam product. With such a configuration, the shoe sole member has a relatively large amount of strain during normal use, and a relatively small amount of strain at a high load. Thus, the shoe including the shoe sole member can exhibit high cushioning properties while suppressing excessive deformation. Here, the high-load state of the shoe sole member means the state where it is subjected to stress of approximately 0.6 to 1.0 MPa.

In the shoe sole member, a resin composition constituting the elastic bodies and a resin composition constituting the resin foam particles both include a polyolefin-based resin as a main component, or both include a polyurethane-based resin as a main component. With such a configuration, the shoe sole member has a high mechanical strength, such as a high tensile strength or a high elongation rate. Thus, the shoe sole member and a shoe including the shoe sole member have an advantage that the elastic bodies and the resin foam particles are hardly separated from each other at their adhesive interfaces even when subjected to a high load.

For example, in the shoe 1 of this embodiment, both the midsole 3 and the outer sole 4 may be formed of the resin composite, and any one of the midsole 3 and the outer sole 4 may be formed of the resin composite. The midsole 3 or the outer sole 4 may be partially formed of the resin composite. Preferably, in the shoe 1 of this embodiment, at least the midsole 3 may be partially or entirely formed of the resin composite.

(Resin Foam Particles)

The resin composite of this embodiment includes the plurality of resin foam particles constituted by the resin composition including the polyolefin-based resin or the polyurethane-based resin as the main component. In the resin composite, the plurality of resin foam particles are integrated together to form a foam product. In this description, the resin composition including the polyolefin-based resin or the polyurethane-based resin as the main component generally means a resin composition including 10 weight % or more of the polyolefin-based resin or the polyurethane-based resin based on the component constituting the resin composition. In this description, the resin foam particles mean foamed particles constituted by a resin composition and having a plurality of voids in the resin composition.

The polyolefin-based resin may be, for example, a low density polyethylene, a medium density polyethylene, ethylene-α-olefin copolymer, ethylene-propylene rubber, polypropylene, ethylene-vinyl acetate, ethylene-acrylic acid copolymer, or the like, and an elastomer including an ethylene crystal phase as a hard segment is preferable. More specifically, the polyolefin-based resin is preferably an elastomer constituted by polymer chains each of which has an ethylene crystal phase(s) at one end or both ends thereof, or a block copolymer having ethylene crystal phases and ethylene-α-olefin copolymerized portions arranged alternately. These polyolefin-based resins may be individually used, or two or more of them may be used in combination.

The polyurethane-based resin may be, for example, a polyurethane-based resin such as a polyether-based polyurethane or a polyester-based polyurethane, and a polyether-based polyurethane is more preferable. These polyurethane-based resins may be individually used, or two or more of them may be used in combination.

The polyolefin-based resin or the polyurethane-based resin may be a thermoplastic resin, and may be a thermosetting resin. In the case where the polyolefin-based resin or the polyurethane-based resin is a thermoplastic resin, it has an advantage of being easily molded. In the case where the polyolefin-based resin or the polyurethane-based resin is a thermosetting resin, it has an advantage of being excellent in heat resistance, chemical resistance, and mechanical strength.

The resin composition (hereinafter referred to also as the resin composition for the particles) that includes the polyolefin-based resin or the polyurethane-based resin (hereinafter referred to also as the main component resin of the particles) as the main component to constitute the plurality of resin foam particles may include any other component, and may further include chemicals such as pigments, antioxidants, and ultraviolet absorbers.

The amount of the main component resin of the particles included in the resin composition for the particles is preferably 25 weight % or more, more preferably 50 weight % or more, still more preferably 80 weight % or more, based on the entire resin composition constituting the elastic bodies.

The initial elastic modulus at 23° C. of the resin composition for the particles is not particularly limited, but may preferably be 10 MPa or more and 400 MPa or less. When the initial elastic modulus at 23° C. of the resin composition for the particles is less than 10 MPa, the shoe sole member including the elastic bodies may have insufficient durability and mechanical strength.

In this description, the elastic modulus of each of various materials and members, such as the resin composition for the elastic bodies, refers to a storage modulus value at 23° C. obtained by measurement at a frequency of 10 Hz in the measurement mode of "tensile mode of a sinusoidal strain", based on JIS K 7244-4: 1999 (equivalent to ISO 6721-4: 1994). For example, the storage modulus can be measured using "Rheogel-E4000", a dynamic viscoelasticity measurement instrument manufactured by UBM as a measurement instrument, under the following conditions:

Measurement mode: Tensile mode of a sinusoidal strain
Frequency: 10 Hz
Distance between chucks: 20 mm
Load: Automatic static load
Dynamic strain: 5 μm
Heating rate: 2° C./min
Test piece: Strip shape having a length of 33±3 mm, a width of 5±1 mm, and a thickness of 2±1 mm In comparing the values of the elastic moduli between different materials or members, the values of their compressive moduli at 23° C. calculated by the compressive stress-strain curves of the materials or members can be used. The compressive stress-strain curves were respectively obtained by cutting the respective materials or members into a cylindrical shape having a diameter of 29 mm and a height of 12 mm, and compressing the sample pieces using an autograph precision universal tester (product name "AG-50kNIS MS" manufactured by Shimadzu Corporation) at 23° C. and at a strain rate of 0.1 mm/sec.

The plurality of resin foam particles can be made from the resin composition for the particles using a conventionally known method. Specifically, the resin foam particles may be made by, for example, an impregnation method in which resin particles free from foaming agents are made, followed by impregnation of the resin particles with a foaming agent, or an extrusion method in which the resin composition for the particles including a foaming agent is extruded into cooling water for granulation. In the impregnation method, the resin composition for the particles is first molded to make resin particles. Next, the resin particles, a foaming agent, and an aqueous dispersant are introduced into an autoclave, followed by stirring under heat and pressure, to impregnate the resin particles with the foaming agent. The impregnated foaming agent is caused to foam to obtain the resin foam particles. In the extrusion method, for example, the resin composition for the particles and a foaming agent are added into an extruder equipped with a die having many small holes at its end, followed by melt-kneading. The molten-kneaded product is extruded from the die into the form of strands and thereafter is immediately introduced into cooling water to be cured. The thus obtained cured material is cut into a specific length to obtain the resin foam particles.

The foaming agent used in the aforementioned methods is not particularly limited and may be, for example, a chemical foaming agent or a physical foaming agent. The chemical foaming agent is a foaming agent that generates a gas by chemical reaction or thermal decomposition. Examples of the chemical foaming agent include inorganic chemical foaming agents such as sodium bicarbonate and ammonium carbonate, and organic chemical foaming agents such as azodicarbonamide. The physical foaming agent is, for example, a liquefied gas or a supercritical fluid, and is foamed by pressure reduction or heating. Examples of the physical foaming agent include aliphatic hydrocarbons such as butane, alicyclic hydrocarbons such as cyclobutane, and inorganic gases such as carbon dioxide gas, nitrogen, and air.

In this embodiment, in order to make the resin foam particles, an impregnation method using a supercritical fluid for foaming the resin composition for the particles is particularly preferably used. In this case, the resin composition for the particles can be dissolved in a supercritical fluid at a comparatively low temperature, and therefore the need for a high temperature for melting the resin composition for the particles is eliminated. Further, the method, in which no chemical foaming agent is used, is advantageous also in that generation of toxic gases due to foaming of a chemical foaming agent is suppressed.

The density and the expansion ratio of the plurality of resin foam particles are not particularly limited, but the density of the plurality of resin foam particles may preferably be 0.05 g/cm$^3$ or more and 0.5 g/cm$^3$ or less. In this case, the resin composite including the plurality of resin foam particles can exhibit high durability while exhibiting sufficient lightweight properties.

The shape and the size of the plurality of resin foam particles are not particularly limited. The shape of the resin foam particles is preferably spherical. In this case, the volume-average particle size D50 (median diameter) of the resin foam particles may be preferably in a diameter range of 1 to 20 mm, more preferably in a diameter range of 2 to 10 mm. In this description, the particle size of the resin particles means a value obtained by measuring the long diameter of each of the particles using a microscope.

The initial elastic modulus of the resin foam particles is not particularly limited, but the initial elastic modulus at 23° C. of the resin foam particles may be preferably 0.2 MPa or more and 20 MPa or less, more preferably 0.3 MPa or more and 10 MPa or less. In this case, the initial stiffness and the amount of strain of the resin composite can be set to values more suitable for the shoe sole member. The initial elastic modulus of the resin foam particles included in the resin composite can be measured by cutting out a foam portion with no elastic bodies included therein from the resin composite to make a test piece, and measuring the initial elastic modulus of the test piece according to the above-mentioned method. The initial elastic modulus of the foamed product can be regarded as the initial elastic modulus of the resin foam particles.

(Elastic Body)

The resin composite of this embodiment further includes the non-foamed elastic bodies. In the resin composite, the elastic bodies are dispersed in the foam product. The resin included as the main component in the resin composition constituting the elastic bodies (hereinafter referred to also as the main component resin of the elastic bodies) has the same base as that of the main component resin of the particles. That is, in the case where the main component resin of the particles is a polyolefin-based rein, the main component resin of the elastic bodies is also a polyolefin-based resin, and in the case where the main component resin of the particles is a polyurethane-based resin, the main component resin of the elastic bodies is also a polyurethane-based resin.

The main component resin of the elastic bodies may be selected from the polyolefin-based resins or the polyurethane-based resins, which have been mentioned above and can be employed as the main component resin of the particles. These polyolefin-based resins or the polyurethane-based resins may be individually used, or two or more of them may be used in combination.

The main component resin of the elastic bodies and the main component resin of the particles may be different from each other as long as they are resins of the same base. Preferably, the melting point of the main component resin of the elastic bodies may be lower than the melting point of the main component resin of the particles.

Examples of a preferable combination between the main component resin of the elastic bodies and the main component resin of the particles include as follows. In the case where the main component resin of the particles is a polyolefin-based resin, the main component resin of the elastic bodies may be a copolymer such as an ethylene-α-olefin copolymer. The copolymer may be any of a random copolymer, a block copolymer, and a graft copolymer, but a block copolymer having a crystal phase is preferable. Examples of such a block copolymer include an elastomer constituted by polymer chains each of which has an ethylene crystal phase(s) at one end or both ends thereof, and a block copolymer having ethylene crystal phases and ethylene-α-olefin copolymerized portions arranged alternately. Specifically, examples of the preferable main component resin of the elastic bodies in the case where the main component resin of the particles is a polyolefin-based resin include, an ethylene-α-olefin copolymer, a styrene-ethylene butylene-olefin crystal copolymer (SEBC), an olefin crystal-ethylene butylene-olefin crystal copolymer (CEBC), or an olefin multi-block copolymer (OBC).

The elastic bodies may further include a plasticizer. The plasticizer may be, for example, paraffinic, naphthenic, aromatic, olefinic, or the like, with paraffinic being more preferred.

The elastic bodies may include any component other than the main component resin of the elastic bodies, and may further include chemicals such as pigments, antioxidants, and ultraviolet absorbers.

The amount of the main component resin of the elastic bodies included in the elastic bodies is preferably 10 weight % or more, more preferably 20 weight % or more, still more preferably 30 weight % or more, most preferably 40 weight % or more, based on the entire resin composition constituting the elastic body. Further, the amount of the main component resin of the elastic bodies included in the elastic bodies is preferably 25 weight % or more, more preferably 50 weight % or more, still more preferably 80 weight % or more, based on the entire resin composition constituting the elastic bodies but excluding the plasticizer.

It is preferable that the initial elastic modulus at 23° C. of the elastic bodies be higher than the initial elastic modulus at 23° C. of the resin foam particles. In this case, even if the resin composite includes a small amount of the elastic bodies, the shoe sole member formed of the resin composite can effectively suppress excessive deformation at a high load. The initial elastic modulus at 23° C. may be preferably 0.1 MPa or more and 10 MPa or less, more preferably 0.2 MPa or more and 5 MPa or less, still more preferably 3 MPa or less. According to the above ranges, the initial stiffness and the amount of strain of the resin composite can be set to values more suitable for the shoe sole member. When the initial elastic modulus of the elastic bodies at 23° C. is less than 0.1 MPa, the shoe sole member including the elastic bodies may have insufficient durability and mechanical strength.

The elastic bodies are non-foamed products, unlike the resin foam particles. Thus, the elastic bodies can have a relatively high density. As a result, the resin composite can effectively exhibit its characteristics that it has a small amount of strain at a high load. In addition, use of the non-foamed elastic bodies also brings an advantage that shrinkage of the resin foam particles, which may occur when a plurality of materials with different degrees of foaming are mixed and hot pressed, does not occur at the time of molding the resin composite, which will be described later.

(Resin Composite)

The resin composite of this embodiment is formed with the plurality of resin foam particles and the elastic bodies integrated together. More specifically, the resin composite is formed with the elastic bodies dispersed in a foam product in which the plurality of resin foam particles are integrated together. With this configuration, the shoe sole member of this embodiment is advantageous in that it is light in weight but can exhibit soft wearing feeling when the foot fits in the shoe, suppress excessive deformation, exhibit cushioning properties, and is excellent in durability, as compared with a conventional shoe sole member. In the resin composite of this embodiment, the resin composition constituting the elastic bodies and the resin composition constituting the resin foam particles both include a polyolefin-based resin as the main component, or both include a polyurethane-based resin as the main component. The resin composite therefore has high adhesive strength at the interfaces between the elastic bodies and the resin foam particles. Thus, the shoe sole member of this embodiment has high mechanical strength since the elastic bodies and the resin foam particles are hardly separated from each other at their adhesive interfaces even when the shoe sole member is subjected to a high load.

The resin composite is obtained by mixing the elastic bodies into the plurality of resin foam particles formed as described above, and then integrating the plurality of resin foam particles having the elastic bodies mixed therewith. The method for integrating the plurality of resin foam particles having the elastic bodies mixed therewith can be, for example, hot pressing the plurality of resin foam particles having the elastic bodies mixed therewith, within a forming mold using a heat press machine, or welding the plurality of resin foam particles and the elastic bodies by a vapor method. By using such a method, the plurality of resin foam particles having the elastic bodies mixed therewith can be integrated in one step.

The elastic bodies can preferably be formed into particles by a conventionally known method, and then mixed with the plurality of resin foam particles. The shape and the size of the elastic bodies formed into particles are not particularly limited.

The method for mixing the elastic bodies with the plurality of resin foam particles is not particularly limited, and the elastic bodies can be mixed with the plurality of resin foam particles by any method.

The temperature for the hot pressing is appropriately adjusted depending on the kind of the main component resin of the particles included in the resin composition for the particles and the kind of the main component resin of the elastic bodies included in the elastic bodies. In the case where the main component resin of the elastic bodies is a thermoplastic resin, it is preferable that the hot pressing be performed at a temperature at which the resin composition of the particles is stable in terms of shape and chemical aspects and at which the elastic bodies have sufficient fluidity. For example, in the case where the main component resin of the particles and the main component resin of the elastic bodies are both formed of a polyolefin-based resin, the hot pressing can be performed appropriately under pressure at a temperature in the range of 80 to 160° C.

Preferably, at the time of the hot pressing, a liquid (for example, water) that can vaporize during hot pressing can be additionally introduced into the forming mold to perform the hot pressing while the liquid is being vaporized. In this case, the heat during the hot pressing is transferred to the inside of the entire forming mold via steam to thereby enable relatively uniform heating of the inside of the entire forming mold.

In this embodiment, various resin composites having a wide range of physical properties can be obtained by appropriately adjusting the mixing ratio between the elastic bodies and the plurality of resin foam particles both included in the resin composite, depending on the required initial stiffness and amount of strain. For example, the amount of the elastic bodies included in the resin composite may be 5 to 90% (weight ratio) based on the entire resin composite. In this case, the weight of the resin composite can be appropriately reduced and the elastic recovery of the resin composite can be appropriately increased.

Alternatively, the resin composite may be made by adjusting the mixing ratio between the plurality of resin foam particles and the resin composition for the elastic bodies depending on the required initial stiffness and amount of strain independently for every given area before dispersing the plurality of resin foam particles in the elastic bodies, and thereafter dispersing the plurality of resin foam particles resin in the elastic bodies. For example, in the case where the method in which the aforementioned mixture of the plurality of resin foam particles and the resin composition for the elastic bodies is hot-pressed is used, the mixing ratio of the resin composition for the elastic bodies in areas of the shoe sole member that are likely to be subjected to a relatively large load, specifically, areas of a heel portion and a forefoot portion, may be higher than the mixing ratio of the resin composition in other areas. The heel portion of the shoe sole member having a large mixing ratio of the resin composition for the elastic bodies can effectively exhibit the shock absorbing effect due to the characteristics of the resin composition for the elastic bodies even in the case where the heel portion is subjected to a relatively large load when the wearer lands in the motion of various sports. In addition, the forefoot portion of the shoe sole member having a large mixing ratio of the resin composition for the elastic bodies suppresses excessive deformation of the shoe sole and thereby enables the wearer to smoothly transfer his or her body weight at the time of the wearer's cutting maneuvers. On the other hand, in an area of the shoe sole member that is less likely to be subjected to a relatively large load, the mixing ratio of the resin composition for the elastic bodies may be made smaller than the mixing ratio of the resin composition in other areas. For example, the midfoot portion of the shoe sole member, which is less likely to be subjected to a large load, may have a certain degree of cushioning properties. Thus, the area of the midfoot portion may have a small mixing ratio of the resin composition for the elastic bodies, thereby making it possible to reduce the weight of the shoe sole member. As described above, the mixing ratio between the plurality of resin foam particles and the resin composition for the elastic bodies is adjusted independently for every given area, so that the resin composite of which the initial stiffness and the amount of strain are different for every given area can be formed.

The resin composite of this embodiment is partially or entirely formed of a resin composite in which the plurality of resin foam particles are integrated with the non-foamed elastic bodies, and thus has a relatively small initial stiffness, a relatively large amount of strain during normal use, and a small amount of strain at a high load. The initial elastic modulus of the resin composite at 23° C. is preferably 10 MPa or less, more preferably 5 MPa or less. The initial stiffness and amount of strain of the resin composite can be determined from a compressive stress-strain curve based on a method that can be used to measure the aforementioned compressive modulus value.

The resin composite of this embodiment has a smaller permanent compression set than that of a foam product used for a conventional shoe sole member. Therefore, the shoe sole member of this embodiment formed of the resin composite has also an advantage of being excellent in elastic recovery.

Further, the resin composite of this embodiment has a high adhesive strength at the interfaces between the elastic bodies and the resin foam particles. Therefore, the shoe sole member of this embodiment formed of the resin composite has also an advantage of having a high mechanical strength.

(Shoe Sole Member and Shoe)

The shoe sole members of this embodiment, and the shoes including the shoe sole members can be produced in the same manner as conventionally known methods for producing shoes.

For example, a method for producing shoe sole members including the shoe sole members of this embodiment includes the following steps:

(a) a first step of producing each of the plurality of resin foam particles from the resin composition for the particles by the abovementioned impregnation method, extrusion method, or the like;

(b) a second step of mixing the elastic bodies with the plurality of resin foam particles obtained in the first step;

(c) a third step of introducing the mixture obtained in the second step into a forming mold, followed by hot-pressing the forming mold using a heat press machine, to obtain a resin composite in which the resin foam particles and the elastic bodies are integrated together; and (d) a fourth step of producing shoe sole members that are partially or entirely formed of the resin composite obtained in the third step.

According to such a method, in the third step, the plurality of first and second resin particles can be integrated in one step.

In the third step, the shoe sole member may be directly molded by hot pressing using a forming mold. In this case, shoe sole members that are entirely formed of the resin composite can be directly produced, and therefore the fourth step can be omitted.

As described above, the shoe sole member of this embodiment is partially or entirely formed of a resin composite in which a plurality of resin foam particles are integrated with non-foamed elastic bodies, and a resin composition constituting the elastic bodies and a resin composition constituting the resin foam particles both include a polyolefin-based resin as a main component, or both include a polyurethane-based resin as a main component. This configuration allows the shoe sole member to have a high adhesive strength at the interfaces between the elastic bodies and the resin foam particles. Accordingly, the shoe sole member partially or entirely formed of the resin composite, and the shoe including the shoe sole member have a high mechanical strength.

The shoe sole member and the shoe according to the present invention are not limited to the configuration of the aforementioned embodiment. Further, the shoe sole member and the shoe according to the present invention are not limited to those having the aforementioned operational effects. Various modifications can be made to the shoe sole member and the shoe according to the present invention without departing from the gist of the present invention.

For example, the resin composite forming the shoe sole member in the aforementioned embodiment is obtained with the elastic bodies dispersed in a foam product in which the resin foam particles are integrated together, but may conversely be obtained with a plurality of resin foam particles dispersed in an elastic body. Such a shoe sole member can achieve softer wearing feeling when the foot fits in the shoe and further suppress excessive deformation at a high load, as compared with a shoe sole member formed of a resin composite in which the non-foamed elastic bodies are dispersed in the plurality of resin foam particles.

Although detailed description beyond the above will not be repeated here, conventionally known technical matters on shoe sole members may be optionally employed in the present invention even if the matters are not directly described in the above.

EXAMPLES

Hereinafter, the present invention will be elucidated by way of specific examples and comparative examples of the present invention. However, the present invention is not limited to the following examples.

The following particulate materials were used as the resin compositions used in Examples 1 to 6 and Comparative Examples 1 to 3 to be described later:

Materials for Resin Foam Particles
 Thermoplastic polyurethane 1 (TPU-1)
 Polyolefin-based resin
 Polyether block amide (PEBA): PEBAX5533 manufactured by Arkema, with density of 1.01 g/cm$^3$ Materials for Elastic Bodies
 Thermoplastic polyurethane 2 (TPU-2)
 Styrene-ethylene butylene-olefin crystal copolymer (SEBC): DAYNARON4600P manufactured by JSR Corporation, with density of 0.91 g/cm$^3$ Olefin multi-block copolymer (OBC): INFUSE9007 manufactured by the Dow Chemical Company, with density of 0.87 g/cm³

Ethylene-α-olefin copolymer: TAFMER DF840 manufactured by Mitsui Chemicals, Inc., with density of 0.89 g/cm³

Styrene-ethylene butylene-styrene copolymer 1 (SEBS-1): Tuftec H11221 manufactured by Asahi Kasei Corporation, with density of 0.89 g/cm³

Styrene-ethylene butylene-styrene copolymer 2 (SEBS-2): a material obtained by mixing various SEBS materials, with density of 0.91 g/cm³

(Resin Foam Particles)

TPU, a polyolefin-based resin, and PEBA as the abovementioned materials for the resin foam particles were respectively used to produce three kinds of resin foam particles (Foams 1 to 3) shown in Table 1 below, using a conventionally known method. For each kind of these resin foam particles 1 to 3, the density (true density) was calculated from the weight and volume of each corresponding kind of resin foam particles. The results are shown in Table 1.

The initial elastic modulus $E_0$ of each kind of the resin foam particles was measured using the method shown below for the each kind of the resin foamed particles. First, a plurality of groups of resin foam particles that are composed of the same kind of material as the material used for the resin foam particles to be measured and that respectively have different densities were made using a conventionally known method. The plate-shaped cavities of the forming mold were filled with the produced resin foam particles of each group, and the forming mold was heated by steam, thereby integrating the resin foam particles together to mold the resin foam product composed of the resin foam particles. As described above, a plurality of resin foam products respectively having different densities were produced for the respective materials used for the resin foam particles to be measured. Next, each of the plurality of resin foam products respectively having different densities were cut into a strip shape having a length of 33±3 mm, a width of 5±1 mm, and a thickness of 2±1 mm to obtain test pieces, and the storage modulus E' [23° C.] at 23° C. of each of the test pieces was measured according to JIS K 7244-4:1999 (equivalent to ISO 6721-4:1994), using "Rheogel-E4000", a dynamic viscoelasticity measurement instrument manufactured by UBM as a measurement instrument, under the following conditions. Thereafter, an approximate expression showing the relationship between the elastic modulus and the density measured for each of the plurality of resin foam products was created, followed by applying the density of each kind of resin foam particles to be measured to the approximate expression, to estimate the initial elastic modulus $E_0$ of the resin foam particles. The results are shown in Table 1.

TABLE 1

| Resin foam particles | Material | Density (g/cm³) | $E_0$ (MPa) |
|---|---|---|---|
| Foam 1 | TPU-1 | 0.201 | 1.55 |
| Foam 2 | Olefin-based resin | 0.165 | 0.84 |
| Foam 3 | PEBA | 0.080 | 1.47 |

(Elastic Body)

One or two kinds of the abovementioned materials for the elastic bodies and paraffin oil (density of 0.88 g/cm³) as a plasticizer were mixed together at a ratio shown in Table 2 using a commercially available twin-screw extruding kneader at 120 to 200° C. to produce gel-like elastic bodies 1 to 7 (GELs 1 to 7) shown in Table 2 below. For each of these elastic bodies 1 to 7, the density was calculated from its weight and volume. Further, the Asker C hardness of each of the elastic bodies was measured by a method similar to the method for the resin composite, which will be described later. The results are shown in Table 2. The initial elastic modulus $E_0$ of each of the elastic bodies was measured as follows. First, each of the elastic bodies was molten and solidified to be molded into a plate shape, followed by being cut into a strip shape having a length of 33±3 mm, a width of 5±1 mm, and a thickness of 2±1 mm, to obtain a test piece. The storage modulus E' [23° C.] at 23° C. of the test piece was measured according to JIS K 7244-4:1999 (equivalent to ISO 6721-4:1994), using "Rheogel-E4000", a dynamic viscoelasticity measurement instrument manufactured by UBM as a measurement instrument, under the following conditions, to obtain the initial elastic modulus $E_0$ of each of the elastic bodies. The results are shown in Table 2.

Measurement mode: Tensile mode of a sinusoidal strain
Frequency: 10 Hz
Distance between chucks: 20 mm
Load: Automatic static load
Dynamic strain: 5 μm
Heating rate: 2° C./min

TABLE 2

| Elastic bodies | Material (Mixing ratio of plasticizer (weight ratio)) | Density (g/cm³) | Hardness (ASKER-C) | $E_0$ (MPa) |
|---|---|---|---|---|
| GEL 1 | TPU-2 (A specific amount of plasticizer is mixed) | 1.17 | 50 | 1.67 |
| GEL 2 | SEBC/SEBS-1 (80/20 weight %) (Material:Plasticizer = 100:145) | 0.89 | 48 | 1.12 |
| GEL 3 | SEBC/SEBS-1 (80/20 weight %) (Material:Plasticizer = 100:100) | 0.89 | 60 | 2.02 |
| GEL 4 | SEBC/OBC (75/25 weight %) (Material:Plasticizer = 100:120) | 0.88 | 50 | 1.27 |
| GEL 5 | SEBC/OBC (50/50 weight %) (Material:Plasticizer = 100:120) | 0.88 | 50 | 1.30 |
| GEL 6 | Ethylene-α olefin copolymer (Material:Plasticizer = 100:100) | 0.88 | 80 | 6.40 |
| GEL 7 | SEBS-2 (Material:Plasticizer = 100:160) | 0.90 | 42 | 0.49 |

(Production of Resin Composite)

Method a: Example 1 and Comparative Examples 2 and 3

The resin foam particles 1 to 3 in amounts shown in Table 3 below were introduced respectively into closed containers. After nitrogen was injected into the closed containers at a pressure of 0.5 MPaG, the inside of the closed containers was allowed to stand at normal temperature over 6 hours. Thus, the resin foam particles were impregnated with nitrogen. The resin foam particles were respectively taken out of the closed containers, and thereafter mixed with the particulated elastic bodies 1 or 7 in a specific amount shown in table 3, to produce mixed particles materials. Subsequently, cavities of a forming mold were filled with each of the mixed particles materials. The forming mold was heated by steam at 0.24 MPa for 35 seconds, thereby integrating the resin foam particles to mold the resin composite. In the obtained resin composite, a foam product in which the resin foam particles were integrated was a continuous body as a whole, and the elastic bodies were scattered in the foam product.

Method B: Examples 2 to 6 and Comparative Example 1

The resin foam particles 2 in specific amounts shown in Table 3 below were kneaded respectively with the particulated elastic bodies 2 to 7 in specific amounts shown in Table 3, at 110° C. using a commercially available two-roll kneader to allow the elastic body matrix materials to melt and form the elastic body matrices, as well as causing the resin foam particles to be dispersed in the elastic body matrices. Thereafter, the kneaded products were allowed to cool to room temperature. Subsequently, cavities of a foaming mold were filled with each of the kneaded products (in so doing, the kneaded product may be cut off, as appropriate, to allow the cavities to be filled with the kneaded product), and the forming mold was heated for two minutes under pressure by a heat press machine, followed by cooling with cold water for 10 minutes for thereby integrating the resin foam particles, to obtain a resin composite. In the obtained resin composite, the resin foam particles were scattered in an elastic body matrix that was a continuous body as a whole. At this time, the elastic body matrix lied between each adjacent resin foam particles as a whole, and few portions at which the resin foam particles were directly welded to each other were present.

(Physical Property Test of Shoe Sole Member)

Density Measurement

The density of each of the resin composites of Examples 1 to 6 and Comparative Examples 1 to 3 was calculated from the weight and volume of each corresponding one of the resin composites. The results are shown in Table 3 below.

Measurement of Hardness

The hardness of each of the resin composites of Examples 1 to 6 and Comparative Examples 1 to 3 was measured using a "Type C durometer" manufactured by Kobunshi Keiki Co., Ltd., as an Asker type C durometer. The results are shown in Table 3 below.

Measurement of Tensile Strength and Elongation Rate

Each of the resin composites of Examples 1 to 6 and Comparative Examples 1 to 3 was cut into a flat plate having a thickness of 4 mm, followed by cutting the flat plate using a dumbbell-shaped type-2 punching die based on JIS K 6251 to obtain a dumbbell-shaped test piece for each of the resin composites. Each of the test pieces was subjected to a tensile test based on JIS K 6251, using an autograph precision universal tester (product name "AG-50kNIS MS" manufactured by Shimadzu Corporation) at 23° C. and at a crosshead speed of 500 mm/min, to thereby measure the tensile strength and the elongation rate of the test piece. The results are shown in Table 3 below.

TABLE 3

| | Resin foam particles/ Elastic bodies (weight ratio) | Method | Molded resin composite | | | |
|---|---|---|---|---|---|---|
| | | | Density (g/cm$^3$) | Hardness (ASKER-C) | Tensile strength (MPa) | Elongation rate (%) |
| Ex. 1 | Foam 1/GEL 1 (85/15) | A | 0.28 | 50 | 1.09 | 120 |
| Ex. 2 | Foam 2/GEL 2 (10/90) | B | 0.66 | 47 | 0.66 | 310 |
| Ex. 3 | Foam 2/GEL 3 (10/90) | B | 0.73 | 55 | 1.16 | 365 |
| Ex. 4 | Foam 2/GEL 4 (10/90) | B | 0.74 | 48 | 0.89 | 360 |
| Ex. 5 | Foam 2/GEL 5 (10/90) | B | 0.74 | 50 | 0.70 | 400 |
| Ex. 6 | Foam 2/GEL 6 (50/50) | B | 0.30 | 47 | 1.10 | 190 |
| C. Ex. 1 | Foam 2/GEL 7 (10/90) | B | 0.70 | 45 | 0.17 | 150 |
| C. Ex. 2 | Foam 2/GEL 7 (50/50) | A | 0.25 | 45 | 0.27 | 110 |
| C. Ex. 3 | Foam 3/GEL 7 (50/50) | A | 0.14 | 48 | 0.31 | 30 |

As is apparent from Table 3, it is understood that the resin composite of Example 1, which is obtained by integrating the resin foam particles composed of a polyurethane-based resin with the elastic bodies including a polyurethane-based resin as the main component, and the resin composites of Examples 2 to 6, which are respectively obtained by integrating the resin foam particles composed of a polyolefin-based resin with the elastic bodies including a polyolefin-based resin as the main component have a high tensile strength as compared with the resin composites of Comparative Examples 1 to 3. It is understood that the resin composite of Example 1 having a configuration in which the elastic bodies are scattered in a foam product with the resin foam particles integrated together has a high elongation rate as compared with the resin composites of Comparative Examples 2 and 3 having a similar configuration thereto. Similarly, it is understood that the resin composites of Examples 2 to 6 respectively having a configuration in which the foam product is scattered in the elastic body matrix have a high elongation rate as compared with the resin composite of Comparative Example 1 having a similar configuration thereto. Thus, it is understood that the resin composites of Examples 1 to 6 have a high mechanical strength as compared with the resin composites of Comparative Examples 1 to 3.

REFERENCE SIGNS LIST

1: Shoe
3: Midsole
4: Outer sole

The invention claimed is:

1. A shoe sole member partially or entirely formed of a resin composite, the resin composite comprising a plurality of resin foam particles and one or more non-foamed elastic bodies, in which a matrix is formed by the plurality of resin foam particles or the one or more non-foamed elastic bodies, and an other of the plurality of resin foam particles or the one or more non-foamed elastic bodies is dispersed in and integrated with the matrix, wherein a resin composition constituting the one or more elastic bodies and a resin composition constituting the plurality of resin foam particles both include a polyolefin-based resin as a main component, the plurality of resin foam particles have an average particle size D50 of 1 mm or more, and each of the plurality of resin foam particles has a spherical shape.

2. The shoe sole member according to claim 1, wherein the one or more elastic bodies have an initial elastic modulus at 23° C. being larger than an initial elastic modulus at 23° C. of the plurality of resin foam particles.

3. The shoe sole member according to claim 1, wherein the one or more elastic bodies have an initial elastic modulus at 23° C. being larger than an initial elastic modulus at 23° C. of the plurality of resin foam particles.

4. A shoe comprising the shoe sole member according to claim 1.

5. A shoe comprising the shoe sole member according to claim 2.

6. The shoe sole member according to claim 1, wherein the shoe sole member comprises at least one of an outer sole configured to be disposed at a position to engage with the ground, or a midsole disposed between an upper member of a shoe and the outer sole.

* * * * *